United States Patent [19]

Sarpeshkar et al.

[11] Patent Number: 5,081,210

[45] Date of Patent: * Jan. 14, 1992

[54] POLYURETHANE ELASTOMERS

[75] Inventors: Ashok M. Sarpeshkar, New Martinsville; Charles S. Gracik, McMechen, both of W. Va.

[73] Assignee: Mobay Corporation, Pittsburgh, Pa.

[ * ] Notice: The portion of the term of this patent subsequent to May 7, 2008 has been disclaimed.

[21] Appl. No.: 478,188

[22] Filed: Feb. 9, 1990

[51] Int. Cl.$^5$ .............................................. C08G 18/10
[52] U.S. Cl. ........................................ 528/59; 528/44; 528/13; 528/55; 524/424; 521/158; 428/213
[58] Field of Search .................... 521/159; 528/60, 55, 528/56

[56] References Cited

U.S. PATENT DOCUMENTS

| | | | |
|---|---|---|---|
| 4,552,944 | 11/1985 | Kamiyama et al. | 528/55 |
| 4,701,476 | 10/1987 | Burchell, Jr. et al. | 521/159 |
| 5,013,810 | 5/1991 | Sarpeshkar et al. | 528/59 |

*Primary Examiner*—John Kight, III
*Assistant Examiner*—Duc Truong
*Attorney, Agent, or Firm*—Joseph C. Gil; Richard E. L. Henderson

[57] ABSTRACT

The present invention is directed to a solid polyurethane composition having a glass transition temperature of from $-20°$ C. to $0°$ C., having a Bayshore rebound of less than 20, and having a Shore A hardness of less than 80.

5 Claims, No Drawings

POLYURETHANE ELASTOMERS

BACKGROUND OF THE INVENTION

Low resiliency elastomers with good impact and shock absorption are potential candidates for shoe insoles, gloves, damping pads, vibration dampers, shock absorber pads or any other application where a soft elastomer with these properties is required. The use of polyurethane elastomers as such energy absorbing media is known. See, e.g., U.S. Pat. Nos. 4,346,205, 4,476,258, 4,485,719, 4,552,944, 4,567,088, 4,604,940 and 4,722,946. Additionally, elastomers prepared from isocyanate terminated prepolymers and relatively low molecular weight hydroxyl group containing compounds are also known. See, e.g., U.S. Pat. No. 4,551,498.

While the prior art compositions have properties adequate for some applications, it has heretofore not been possible to produce an elastomer from a two component polyurethane system where the two components could be reacted in a weight ratio of from 1.5:1 to 1:1.5, and which system would yield elastomers with relatively low hardnesses and low rebounds, and with glass transition temperatures of from $-20°$ C. to $0°$ C.

DESCRIPTION OF THE INVENTION

The present invention is directed to an elastomer which satisfies the above criteria. In addition, the systems of the present invention can generally be processed and demolded in relatively short cycle times. Finally, the elastomers of the present invention have overall good physical properties and specifically have good tear strength. More particularly, the present invention is directed to a solid polyurethane composition having a glass transition temperature of from $-20°$ C. to $0°$ C., having a Bayshore rebound of less than 20, and having a Shore A hardness of less than 80, and being prepared by reacting:
  a) an isocyanate terminated prepolymer having an isocyanate group content of from about 5 to about 35%, and preferably from about 8 to about 30% by weight, said prepolymer prepared by reacting:
    i) an aromatic diisocyanate with
    ii) a polyhydroxyl compound selected from the group consisting of
      1) diols having molecular weights of from about 450 to about 2000,
      2) triols having molecular weights of from about 4000 to about 6000, and
      3) mixtures thereof, with
  b) a hydroxyl functional compound selected from the group consisting of
    i) one or more diols having molecular weights of from 62 to about 1000,
    ii) one or more triols having molecular weights of from about 500 to about 2000, and
    iii) a mixture of
      1) one or more triols having molecular weights of from more than 300 to about 3000, and
      2) one or more diols having molecular weights of from about 200 to about 3000, with the weight ratio component iii)1) to component iii)2) being from 1:1 to 1:3, and,
  c) no more than 10% by weight based on the weight of component b) of one or more triols having molecular weights of 300 or less, the isocyanate to hydroxyl equivalent ratio being from 0.95:1 to 1.2:1, and the weight ratio of component a) to component b) being from about 11:1 to 1:1.5, preferably from 1.5:1 to 1:1.5, and most preferably from 1.2:1 to 1:1.2.

All of the various reactants are known in the art. The polyisocyanates useful as starting components for the production of the elastomers of the present invention may be any aromatic diisocyanate, such as those described, for example, by W. Siefken in Justus Liebigs Annalen der Chemie, 562, pages 75 to 136. These include, for example, phenylene-1,3- and -1,4-diisocyanate; tolylene-2,4- and -2,6-diisocyanate and mixtures of these isomers; diphenylmethane-2,4'-and/or 4,4'-diisocyanate; naphthylene-1,5-diisocyanate; m- and p-isocyanato-phenylsulphonyl-isocyanates according to U.S. Pat. No. 3,454,606; perchlorinated aryl polyisocyanates as described, e.g. in U.S. Pat. No. 3,277,138; the diisocyanates described in U.S. Pat. No. 3,492,330; and the like.

The commercially readily available diisocyanates are generally preferred. These include, for example, tolylene-2,4-and -2,6-diisocyanate and mixtures of these isomers ("TDI"); and methylenebis(phenyl isocyanates) ("MDI").

The starting components used for the production of the elastomers of the present invention also include a variety of different hydroxyl group containing compounds which contain two or three hydroxyl groups. In the preparation of the prepolymer, the hydroxyl compound is selected from the group consisting of
  1) diols having molecular weights of from about 450 to about 2000, preferably polyether and polyester diols having molecular weights of from about 450 to about 2000,
  2) triols having molecular weights of from about 4000 to about 6000, preferably polyether triols having molecular weights of from about 4000 to about 6000, and
  3) mixtures thereof.

The hydroxyl component to be reacted with the prepolymer component to form the elastomer of the present invention is a hydroxyl functional compound selected from the group consisting of
  i) one or more diols having molecular weights of from 62 to about 1000,
  ii) one or more triols having molecular weights of from about 500 to about 2000, preferably polyether triols having molecular weights of from about 500 to about 2000, and
  iii) a mixture of
    1) one or more triols having molecular weights of from about 300 to about 3000, preferably polyether triols having molecular weights of from about 300 to about 3000,
    2) one or more diols having molecular weights of from about 200 to about 3000, preferably polyether diols having molecular weights of from about 300 to about 3000, with the weight ratio component iii)1) to component iii)2) being from 1:1 to 1:3.

The hydroxyl compounds useful in producing both the prepolymer and the elastomer itself are generally known in the polyurethane art. All that is necessary is that the molecular weights and amounts of materials be as noted above. Such hydroxyl compounds include, for example, polyesters, polyethers, polythioethers, polyacetals, polycarbonates and polyester amides containing at least 2, and no more than 3 hydroxyl groups, such as those known for the production of polyurethanes. A key to the present invention resides in the proper selection of hydroxyl compound for production of the prepolymer and the elastomer.

Hydroxyl group-containing polyesters used may be, for example, reaction products of polyhydric, preferably dihydric alcohols, optionally with the addition of trihydric alcohols, and polybasic, preferably dibasic carboxylic acids. Instead of using the free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. with halogen atoms, and/or be unsaturated. The following are mentioned as examples: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, optionally mixed with monomeric fatty acids, dimethylterephthalate and terephthalic acid-bis-glycol esters. Suitable polyhydric alcohols to produce such polyesters include, e.g. ethylene glycol; propylene glycol-(1,2) and -(1,3); butylene glycol-(1,4) and -(2,3); hexanediol- (1,6); octanediol-(1,8); neopentyl glycol; cyclohexane dimethanol (1,4-bis-hydroxy-methylcyclohexane); 2-methyl-1,3-propanediol; glycerol; trimethylolpropane; hexanetriol-(1,2,6); butanetriol-(1,2,4); trimethylolethane; diethylene glycol; triethylene glycol; tetraethylene glycol; polyethylene glycols; dipropylene glycol; polypropylene glycols; dibutylene glycol and polybutylene glycols. Polyesters of lactones, such as ε-caprolactone, and hydroxycarboxylic acids, such as ω-hydrxycaproic acid, may also be used.

The polyethers used according to the present invention contain at least 2 and no more than 3 hydroxyl groups are known. They may be prepared, for example, by the polymerization of epoxides, such as ethylene oxide, propylene oxide, butylene oxide, tetrahydrofuran, styrene oxide or epichlorohydrin, either each on its own, (e.g. in the presence of $BF_3$) or by chemical addition of these epoxides, optionally as mixtures or successively, to starting components having reactive hydrogen atoms, such as water, alcohols or amines, e.g. ethylene glycol, propylene glycol-(1,3) or -(1,2), trimethylol propane, 4,4'-dihydroxydiphenylpropane, aniline, ammonia, or ethanolamine. It is frequently preferred to use polyethers which contain predominantly primary OH groups (up to 90%, by weight, based on all the OH groups present in the polyether). Polyethers which have been modified with vinyl polymers, for example the compounds obtained by the polymerization of styrene and acrylonitrile in the presence of polyethers (U.S. Pat. Nos. 3,383,351; 3,304,273; 3,523,093 and 3,110,695 and German Patent 1,152,536) are also suitable. Polybutadienes containing OH groups may also be used.

Among the polythioethers which should be particularly mentioned are the condensation products obtained from thiodiglycol on its own and/or with other glycols, dicarboxylic acids, formaldehyde, aminocarboxylic acids or amino alcohols. The products obtained are polythio mixed ethers, polythio ether esters or polythioether ester amides, depending on the co-components.

Suitable polyacetals include, e.g. the compounds which may be obtained from glycols, such as diethylene glycol, triethylene glycol, 4,4'-dioxethoxy-diphenyldimethylmethane or hexanediol, and formaldehyde. Polyacetals suitable for the purpose of the present invention may also be prepared by polymerizing cyclic acetals.

Suitable polycarbonates containing hydroxyl groups are known and may be prepared, for example, by the reaction of diols, such as 1,3-propanediol, 1,4-butanediol and/or 1,6-hexanediol, diethylene glycol, triethylene glycol or tetraethyleneglycol, with diarylcarbonates, e.g. diphenyl carbonate, or phosgene.

Suitable polyester amides and polyamides include, e.g. the predominantly linear condensates obtainable from polybasic saturated and unsaturated carboxylic acids or their anhydrides and polyvalent saturated and unsaturated amino alcohols, diamines, polyamines or mixtures thereof.

Polyhydroxyl compounds already containing urethane or urea groups as well as modified or unmodified natural polyols, such as castor oil, carbohydrates or starch may also be used. Additionally, products of alkylene oxides and phenol/formaldehyde resins or of alkylene oxides and urea/formaldehyde resins are also suitable according to the present invention.

Also useful are hydroxyl compounds having relatively low molecular weights. They contain 2 or 3 hydroxyl groups. The following are mentioned as examples of such compounds: ethylene glycol; 1,2- and 1,3-propylene glycol; 1,4- and 2,3-butylene glycol; 1,5-pentanediol; 1,6-hexanediol; 1,8-octanediol; neopentylglycol; 1,4-bis-hydroxymethylcyclohexane; 2-methyl-1,3-propanediol; glycerol; trimethylolpropane; 1,2,6-hexanetriol; trimethylolethane; diethylene glycol; triethylene glycol; tetraethylene glycol; polyethylene glycols; polytetramethylene glycols; dipropylene glycol, polypropylene glycols; dibutylene glycol; polybutylene glycols; 4,4'-dihydroxy-diphenylpropane; dihydroxymethylhydroquinone; diethanolamine; triethanolamine; 3-aminopropanol; and the like.

It is presently preferred to use polypropylene glycols in preparing the prepolymers and to use polypropylene glycols, polytetramethylene glycols, and/or polypropylene triols for reaction with the prepolymers to make the elastomers of the present invention.

Representatives of the various hydroxyl group containing compounds which may be used according to the present invention have been described, e.g. in High Polymers, Vol. XVI, "Polyurethanes, Chemistry and Technology", by Saunders-Frisch, Interscience Publishers, New York, London, Volume I, 1962, pages 32–42 and pages 44–54 and Volume II, 1964, pages 5–6 and 198–199 and in Kunststoff-Handbuch, Volume VII, Vieweg-Hochtlen, Carl-Hanser-Verlag, Munich, 1966, e.g. on pages 45 to 71. The only essential requirement in selecting the particular hydroxyl compound for either the prepolymer production or the elastomer production is that the molecular weight limitations set forth above be observed. It is only in using these narrow ranges of hydroxyl compounds that the elastomers of the present invention can be obtained. In addition, the amounts of components used are essential to produce the elastomers of the present invention.

Both the prepolymer and the elastomer itself are prepared using techniques generally known in the art.

In general, the prepolymer is prepared by reacting the hydroxyl compound with an excess of the diisocyanate. This reaction is preferably carried out at elevated temperatures of from 50° C. to about 150° C. until all the hydroxyl groups of the hydroxyl compound have disappeared. In producing the elastomers of the invention, this prepolymer is then mixed with component b). The resultant mixture can then be cast into molds maintained at temperatures of from about 50° C. to about 150° C., where the final curing of the product takes place.

The invention is further illustrated by the following examples in which all parts and percentages are by weight, unless otherwise indicated.

Processing: A known weight of Side-A was kept stirred at 32° C. in a dry metal can. A calculated amount of Side-B, also at 32° C., was added to it. The mixture was stirred for 30 seconds and poured into a mold preheated to 60° C. The cast part was cured in an oven at 60° C. for 20 minutes, demolded, and post cured at ambient temperature in open air for 16 hours, before the Shore A hardness (ASTM D-2240) and Bayshore Rebound (ASTM D-3574-H) were checked. Glass transition temperatures, were determined, using Differential Scanning Calorimetry.

The formulations used and the results obtained were as indicated in the following table:

| Example | A-Side | % NCO | B-Side, pbw | Weight Ratio, A-side:B-side | Hardness, Shore A | Rebound | Tg, °C. |
|---|---|---|---|---|---|---|---|
| 1 | TDS/ DIOL A | 18.5 | 54 DIOL A 46 TRIOL A | 1:1 | 60A | 5 | −6.0 |
| 2 | MDI/ DIOL A | 20.0 | 51 DIOL A 49 TRIOL A | 1:1 | 63A | 9 | N.T.* |
| 3 | TDS/ DIOL C | 18.5 | 59 DIOL A 31 TRIOL A 10 DIOL B | 1:1 | 55A | 8 | N.T. |
| 4 | TDI/ DIOL D | 9.7 | DIOL E | 11:1 | 64A | 6 | N.T. |
| 5 | TDI/ DIOL D | 9.7 | 94 DIOL E 6 TRIOL B | 11:1 | 63A | 8 | N.T. |
| 6 | TDI/ DIOL D | 29.3 | 4.5 DIOL D 1.0 DIOL E | 1:1 | 61A | 7 | −5.4 |

*N.T.: Not determined.

EXAMPLES

In the examples which follow, the following materials were used:

ISOCYANATES

TDS: 2,4-toluene diisocyanate
MDI: 4,4'-methylenebis(phenyl isocyanate)
TDI: an 80/20 mixture of 2,4- and 2,6-toluene diisocyanate

HYDROXYL COMPOUNDS

DIOL A: a polyoxypropylene glycol having a molecular weight of 1000
TRIOL A: a trimethylolpropane/propylene oxide adduct having a molecular weight of 455
DIOL B: a diethylene glycol/ethylene oxide adduct having a molecular weight of 200
DIOL C: a 2000 molecular weight polyester diol prepared by reacting adipic acid, butane diol and ethylene glycol (molar ratio of butane diol to ethylene glycol=1:1).
DIOL D: a 650 molecular weight polytetramethylene glycol
DIOL E: 1,4-butane diol
TRIOL B: trimethylolpropane

GENERAL PROCEDURE

A-Side: The prepolymers were prepared by simultaneously heating (60° C.) and degassing a mixture of the diisocyanate and the hydroxyl compound for 2 hours.

B-Side: The B-side was prepared by physically blending two or more hydroxyl compounds and degassing the resulting homogeneous mixture.

Depending on the composition of the B-side, the amounts were calculated according to the NCO content of the A-Side at an NCO/OH equivalent ratio of from 1.03:1 to 1.07:1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solid polyurethane composition having a glass transition temperature of from −20° C. to 0° C., having a Bayshore rebound of less than 20, and having a shore A hardness of less than 80, and being prepared by reacting:
   a) an isocyanate terminated prepolymer having an isocyanate group content of from about 5 to about 35%, said prepolymer prepared by reacting:
      i) an aromatic diisocyanate with
      ii) a polyhydroxyl compound selected from the group consisting of
         1) diols having molecular weights of from about 450 to about 2000,
         2) triols having molecular weights of from about 4000 to about 6000, and
         3) mixtures thereof, with
   b) a hydroxyl functional compound selected from the group consisting of
      i) one or more diols having molecular weights of from 62 to about 1000,
      ii) one or more triols having molecular weights of from about 500 to about 2000, and
      iii) a mixture of
         1) one or more triols having molecular weights of from more than 300 to about 3000, and
         2) one or more diols having molecular weights of from about 200 to about 3000, with the weight ratio of component iii)1) to component iii)2) being from 1:1 to 1:3, and,
   c) no more than 10% by weight based on the weight of component b) of one or more triols having molecular weights of 300 or less, the isocyanate to hydroxyl equivalent ratio being from 0.95:1 to 1.2:1, and the weight ratio of component a) to component b) being from about 1.5:1 to 1:1.5.

2. The composition of claim 1 wherein said prepolymer has an isocyanate group content of from about 8 to about 30% by weight.

3. The composition of claim 1 wherein the weight ratio of component a) to component b) is from 1.2:1 to 1:1.2.

4. The composition of claim 1 wherein said polyhydroxyl compound a)ii) is selected from the group consisting of 1) polyether and polyester diols having molecular weights of from about 450 to about 2000,
2) polyether triols having molecular weights of from about 4000 to about 6000,
3) mixtures thereof.

5. The composition of claim 1 wherein said hydroxyl functional compound b) is a mixture iii) of
1) one or more triols having molecular weights of from more than 300 to about 3000, and
2) one or more diols having molecular weights of from about 200 to about 3000,
with the weight ratio of component iii)1) to component iii)2) being from 1:1 to 1:3.

* * * * *